(12) United States Patent
Nagao

(10) Patent No.: US 11,683,572 B2
(45) Date of Patent: Jun. 20, 2023

(54) LENS APPARATUS AND IMAGE PICKUP APPARATUS

(71) Applicant: CANON KABUSHIKI KAISHA, Tokyo (JP)

(72) Inventor: Yuki Nagao, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 66 days.

(21) Appl. No.: 17/375,978

(22) Filed: Jul. 14, 2021

(65) Prior Publication Data

US 2022/0030144 A1 Jan. 27, 2022

(30) Foreign Application Priority Data

Jul. 22, 2020 (JP) .............................. JP2020-125705

(51) Int. Cl.
*H04N 23/55* (2023.01)
*H04N 23/54* (2023.01)
*G03B 3/10* (2021.01)

(52) U.S. Cl.
CPC ............. *H04N 23/55* (2023.01); *H04N 23/54* (2023.01); *G03B 3/10* (2013.01)

(58) Field of Classification Search
CPC ...... H04N 23/55; H04N 23/54; H04N 23/633; H04N 23/66; H04N 23/667; H04N 5/2254; H04N 5/2253; H04N 5/23203; H04N 5/23245; H04N 5/232939; G03B 3/10; G03B 2206/00; G03B 17/14; G03B 2217/002

See application file for complete search history.

(56) References Cited

U.S. PATENT DOCUMENTS

2012/0287328 A1* 11/2012 Kawai .................... G02B 7/102
348/E5.042

FOREIGN PATENT DOCUMENTS

| JP | H07295018 A | | 11/1995 |
|---|---|---|---|
| JP | 2001245196 A | | 9/2001 |
| JP | 2004163565 A | * | 6/2004 |
| JP | 2004163565 A | | 6/2004 |
| JP | 2007072252 A | | 3/2007 |
| JP | 2013061665 A | | 4/2013 |

OTHER PUBLICATIONS

Machine English Translation of JP-2004163565-A. Published on Jun. 10, 2004 (Year: 2004).*

* cited by examiner

*Primary Examiner* — Nelson D. Hernández Hernández
(74) *Attorney, Agent, or Firm* — Canon U.S.A., Inc. IP Division

(57) ABSTRACT

Provided is a lens apparatus connected to a camera configured to pick up an image based on a set pickup parameter, comprising: a first operating member; a controller configured, based on an operation of the first controller, to control a function of the lens apparatus in a first mode and to output a signal for switching a setting of a combination of pickup parameters including a function of the camera in a second mode; and a switching device configured to switch from the first mode to the second mode, in which the combination of pickup parameters in the second mode is previously set by a user.

20 Claims, 7 Drawing Sheets

LENS APPARATUS AND IMAGE PICKUP APPARATUS

BACKGROUND OF THE DISCLOSURE

Field of the Disclosure

The aspect of the embodiments relates to a lens apparatus and an image pickup apparatus.

Description of the Related Art

A variety of image pickup systems is widely used, which includes an image pickup apparatus provided with an image pickup element such as CCD sensors and CMOS sensors and a lens apparatus which is interchangeable with the image pickup apparatus. When using these image pickup systems, users start shooting images after selecting shooting mode of the image pick apparatus and changing parameters for shooting images along with shooting environment and characteristic of objects in order to obtain visual representation required by the users. There is disclosed an image pickup apparatus having a configuration for performing this operation quickly and without destroying the state in which the image pickup system is set in position for shooting as much as possible.

Japanese Patent Application Laid-Open No. 2001-245196 discloses an image pickup apparatus in which an image pickup state of camera or a state of a lens apparatus can be restored as a current state by an operation of controller. Japanese Patent Application Laid-Open No. 2007-72252 discloses that the function on the lens side and the function on the main body side are controlled according to a combination of operations of first and second operating members provided on the lens side.

The apparatus disclosed in Japanese Patent Application Laid-Open No. 2001-245196 has a different operation part for each object to be operated, so that it is necessary to provide many operation buttons on the controller. The apparatus disclosed in Japanese Patent Application Laid-Open No. 2007-72252 has a slide switch for selecting either the camera body or the lens apparatus as an object of operation, so that it is not possible to quickly confirm whether the current object to be operated is camera body or lens apparatus. Japanese Patent Application Laid-Open No. 2001-245196 and Japanese Patent Application Laid-Open No. 2007-72252 are silent for an immediate calling of stored combination of a plurality of parameters.

SUMMARY OF THE DISCLOSURE

The aspect of the embodiments provides a lens apparatus connected to a camera configured to pick up an image based on a set pickup parameter. The lens apparatus includes: a first operating member, a controller configured, based on an operation of the first controller, to control a function of the lens apparatus in a first mode and to output a signal for switching a setting of a combination of pickup parameters including a function of the camera in a second mode; and a switching device configured to switch from the first mode to the second mode, in which the combination of pickup parameters in the second mode is previously set by a user.

Further features of the disclosure will become apparent from the following description of exemplary embodiments with reference to the attached drawings.

DESCRIPTION OF THE EMBODIMENTS

Figure 1:
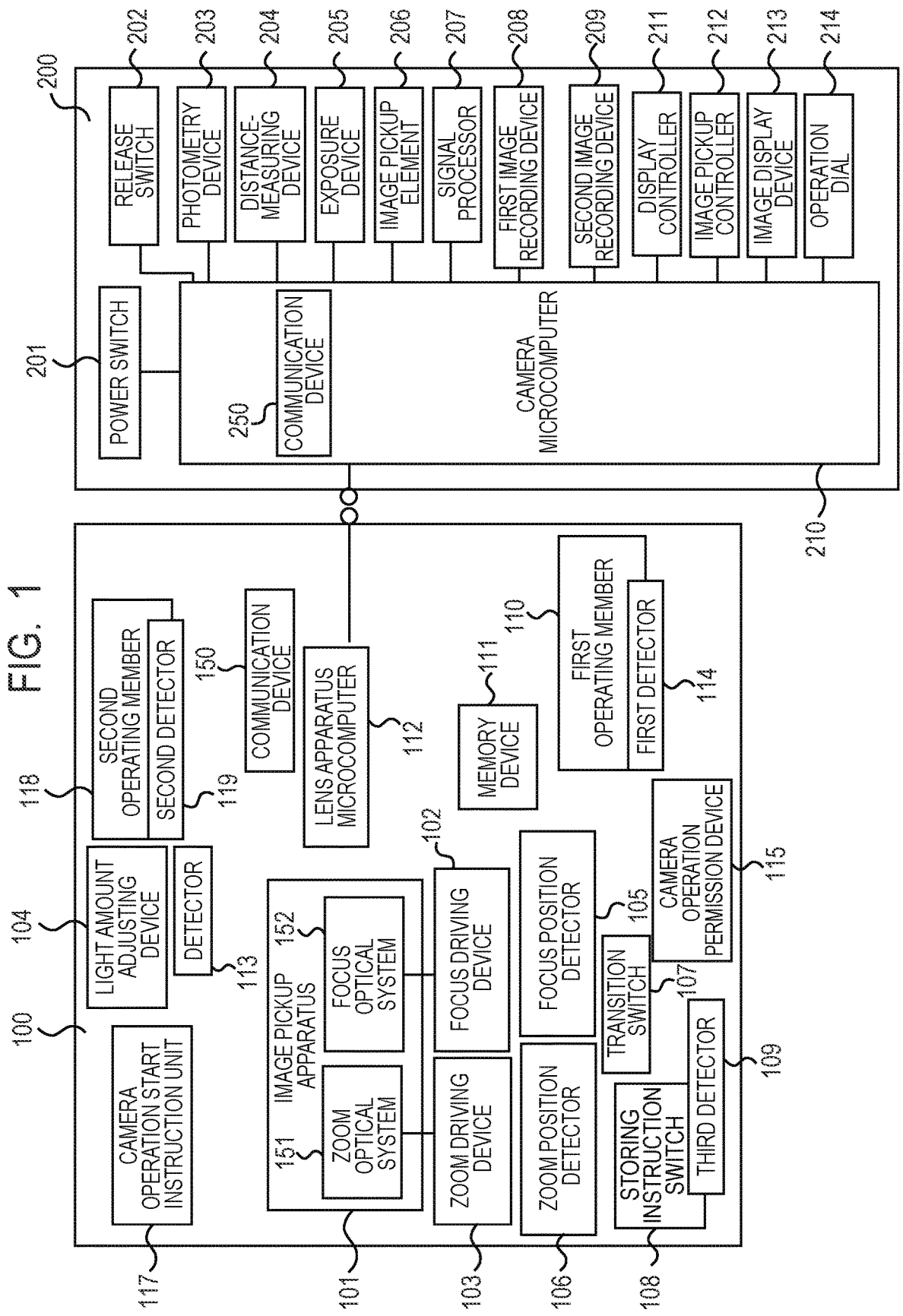
FIG. 1 is a lens apparatus and a camera system diagram of first embodiment.

Embodiments of the disclosure are described below with reference to the accompanying drawings.

Embodiment 1

The lens apparatus 100 has an image pickup optical system 101, a focus driving device 102, a zoom driving device 103, a light amount adjusting device 104, a focus position detector 105, a zoom position detector 106, a lens microcomputer (lens controller) 112, a memory 111, and a communication device 150 for communication with a camera 200. An amount of light adjusting device 104 has a detector 113 for detecting the state of the light amount adjusting device 104 is also provided.

The lens apparatus 100 includes a transition switch 107 for storing instruction and instruction for transition to a store mode, a storing instruction switch 108 for instructing to store depending on the state in the store mode, and a third detector 109 for detecting the state of the storing instruction switch 108 as an operation system. When the third detector 109 detects an operation of the storing instruction switch 108, it can be informed to the user that the operation is performed by a pattern or volume of buzzer sound, an LED flashing state, a display panel, or the like.

The image pickup optical system 101 condenses light from object and forms an optical image of the object on and image pickup element 206. The image pickup optical system 101 also has a plurality of lenses such as a zoom optical system 151 moving in an optical axis direction for zooming and a focus optical system 152 moving in the optical axis direction for focusing. A focus driving device 102 and a zoom driving device 103 move the focus optical system 152 and the zoom optical system 151 in the optical axis direction, respectively. The focus driving device 102 and the zoom driving device 103 can be constituted by an ultrasonic motor, a DC motor, a stepping motor, and the like, and are controlled to drive by the lens microcomputer 112.

The focus position detector 105 detects the position on the optical axis of the focus optical system and is constituted by an encoder, a magnetic sensor, and the like. For example, the position of the focus optical system 152 can be detected by configuring an output key of the focus driving device 102 to be rotatable about the optical axis, the encoder to generate pulse signal according to the amount of rotation along with the rotation of the output key, and a brush to run on a gray code pattern.

The first operating member 110 and the second operating member 118 are ring members provided around the optical axis of the image pickup optical system 101. The fact that the first operating member 110 is operated and the operation amount and the operation direction of the operation are detected by the first detector 114.

The fact that the second operating member 118 is operated and the operation amount and the operation direction of the operation are detected by the second detector 119.

The lens microcomputer 112 is electrically connected to the camera microcomputer 210, is a controller to exchange the information required for the image pickup operation and comprises a microcomputer (CPU, processor). The lens microcomputer 112 and the camera microcomputer 210 perform two-way data communication.

In this embodiment, by turning on state the storing instruction switch 108 once within predetermined time, the focus position detected by the current focus position detector 105 at the time is stored in the memory device 111. The storing instruction switch 108 of this embodiment is a mechanical switch which automatically returns, and remains on-state while the operating force is applied whereas turning into off-state when the operating force is released. A storing instruction switch 108 is used, for example, a position of the focus optical system which gives an in-focus state to a certain object distance is stored in the memory device 111 as a focus position. By storing the focus preset information in the memory device 111, the focus optical system can be returned to the stored position by a predetermined return operation even if the focus optical system is moved to a position different from the stored position after storing the focus preset information (Focus Preset function).

The memory device 111 stores focus preset information, information required for a control method to be described later and its program, and various other information. The information required for the focus preset includes a velocity with which the focus optical system is moved to the preset position, and the like.

The camera 200 has a power switch 201, a release switch 202, a photometry device 203, a distance-measuring device 204, an exposure device 205, an image pickup element 206, a signal processor 207, a first image recording device 208, a second image recording device 209, a camera microcomputer 210, and a communication device 250 for communicating with the lens apparatus 100.

The camera microcomputer 210 controls the entire camera 200 in accordance with a program stored the memory device not shown.

The display controller 211 controls the display on a finder of the camera 200 and the display in live view of the object image on the rear display device, and controls display for adjusting the pickup parameters. That is, on the display device provided on the back side of the camera 200, an image for selecting an adjustment mode of the pickup parameters, such as an exposure correction value, a stop value, a shutter speed, and a focus state, is displayed. The display controller 211 controls the display. An image for setting numerical values of the pickup parameters such as the exposure correction value is displayed on a finder display device provided in the camera 200 and for the observation through an eyepiece device, by superimposing on the object image, and the display controller 211 controls the display.

The image pickup controller 212 controls various image pickup mode settings such as an aperture priority mode and a shutter speed priority mode, and parameters related to various image pickups, and performs image pickups with the set image pickup mode and the set pickup parameter being reflected. The parameter related to the image pickup includes a stop value, a shutter speed, and ISO sensitivity.

The signal processor 207 performs various image processing of image data input from the image processing 206, such as a white balance, a color correction, an image generation for live view display, an image generation for moving image, an image compression/image expansion, an edge enhancement level. It should be noted that although the contents of the image processing may be adjusted one by one by the user, in the camera of the present embodiment, a plurality of recommended combinations of the parameters such as a color correction and an edge enhancement level in accordance with the respective image objects are preliminarily stored, such as "portrait", "landscape", and the like, and the like. Therefore, the user is to select "portrait" or the like as the selection of the content to be image-processed before picking up an image.

The first image recording device 208 and the second image recording device 209 are constituted by a recording medium detachable to a camera body or a recording medium built in a camera body. In the first image recording device 208 and the second image recording device 209, image data, such as still images and/or moving images, output from the image pickup element 206 and image-processed by the signal processor 207, and accompanying data are recorded. The image data can be stored in selectively either one of the first image recording device 208, the second image recording device 209, or both the first image recording device 208 and the second image recording device 209 to reduce the risk of data loss.

Figure 2:
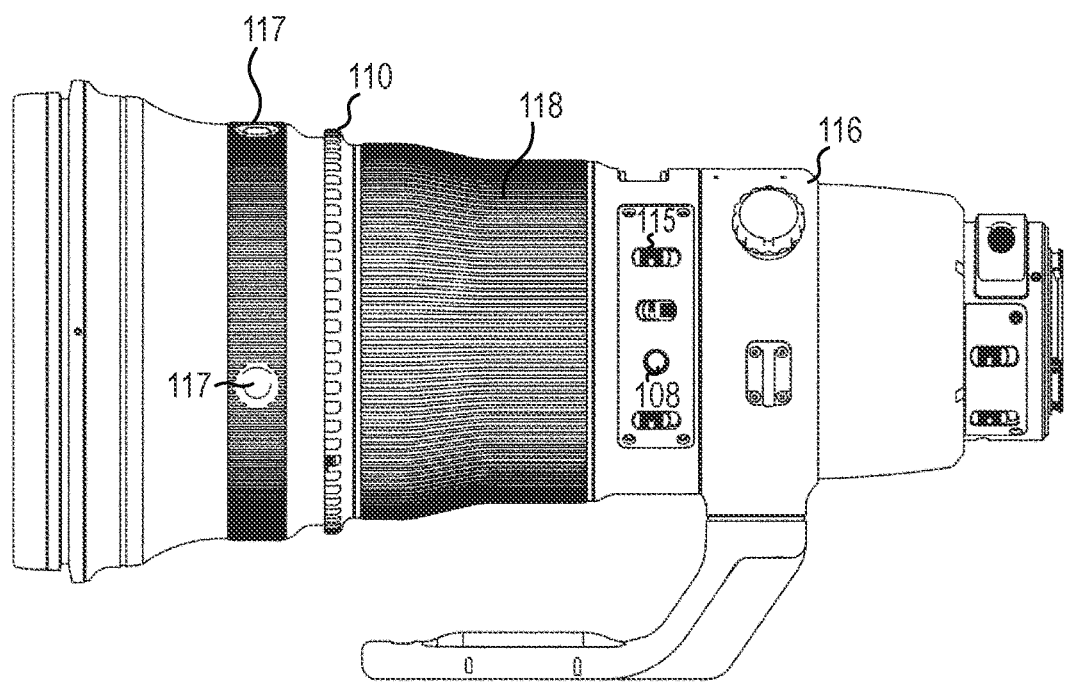
FIG. 2 is a side view of an operating member of the lens apparatus of the first embodiment.

FIG. 2 shows an external view of the lens apparatus 100 of the aspect of the embodiments.

A storing instruction switch 108 and a camera operation permission device (lock device, switching device) 115 are provided in a switch panel of an exterior part of the lens apparatus 100.

The first operating member 110 is provided on the exterior of the lens apparatus 100 as a ring member rotatable about the optical axis of the image pickup optical system 101. A knurled pattern for non-slip is provided to facilitate the rotation operation. The first operating member 110 is provided with movable ends on both sides of the rotating operation about the optical axis so that a rotation can be performed by a predetermined rotation range about the optical axis. When no operating force is applied, the apparatus is configured to automatically return to a predetermined neutral position (not necessarily a central position) of the rotation movable range at all times.

In this specification, a state in which the rotation operating position of the first operating member 110 is at a neutral position is defined as a "neutral state". When the first operating member 110 is rotated from the neutral position to one rotation direction (one side), the first detector 114 outputs a signal notifying the first state at a predetermined position set before reaching the moving end. That is, when the first detector 114 detects the state where the first operating member 110 is rotated from neutral state to one direction, a signal notifying the first state is output. Similarly, when the first operating member 110 is rotated to the other rotation direction (the other side), the first detector 114 outputs a signal indicating the second state at a predetermined position set before reaching the other moving end. That is, when the first detector 114 detects a state where the first operating member 110 is rotated from neutral state to the second direction, a signal notifying the second state is output. Therefore, in this embodiment, the first detector 114 detects three states (neutral position, first state, second state) of the first operating member 110.

The second operating member 118 is provided as a ring member rotatable about the optical axis of the image pickup optical system 101 on the exterior of the lens apparatus 100. The second operating member 118 is a ring endlessly rotatable about the optical axis. By a menu setting in the camera 200, a function is assigned to the second operating member 118 as a ring capable of adjusting various adjustments related to the image pickup such as focus adjustment and stop value adjustment. The second operating member 118 has a configuration for allowing a user to feel a click feeling at a predetermined rotational angle interval in rotation around the optical axis in order to transmit the operation feeling to the user.

The camera operation permission device 115 is configured as a slide switch for selecting permission or non-permission in various parameters in the lens apparatus 100 and the camera 200.

The camera operation start instruction unit (trigger device, switching device) 117 are provided on the exterior of the lens apparatus 100 (outer circumference), and includes 4 arrangements (two locations are not shown) provided about the optical axis of the image pickup optical system 101. The camera state operation start instruction unit 117 of the present embodiment is a mechanical switch that automatically returns to a predetermined position, and outputs an on-state signal when an operating force is applied to and outputs an off-state signal when the operating force is released.

Figure 4:
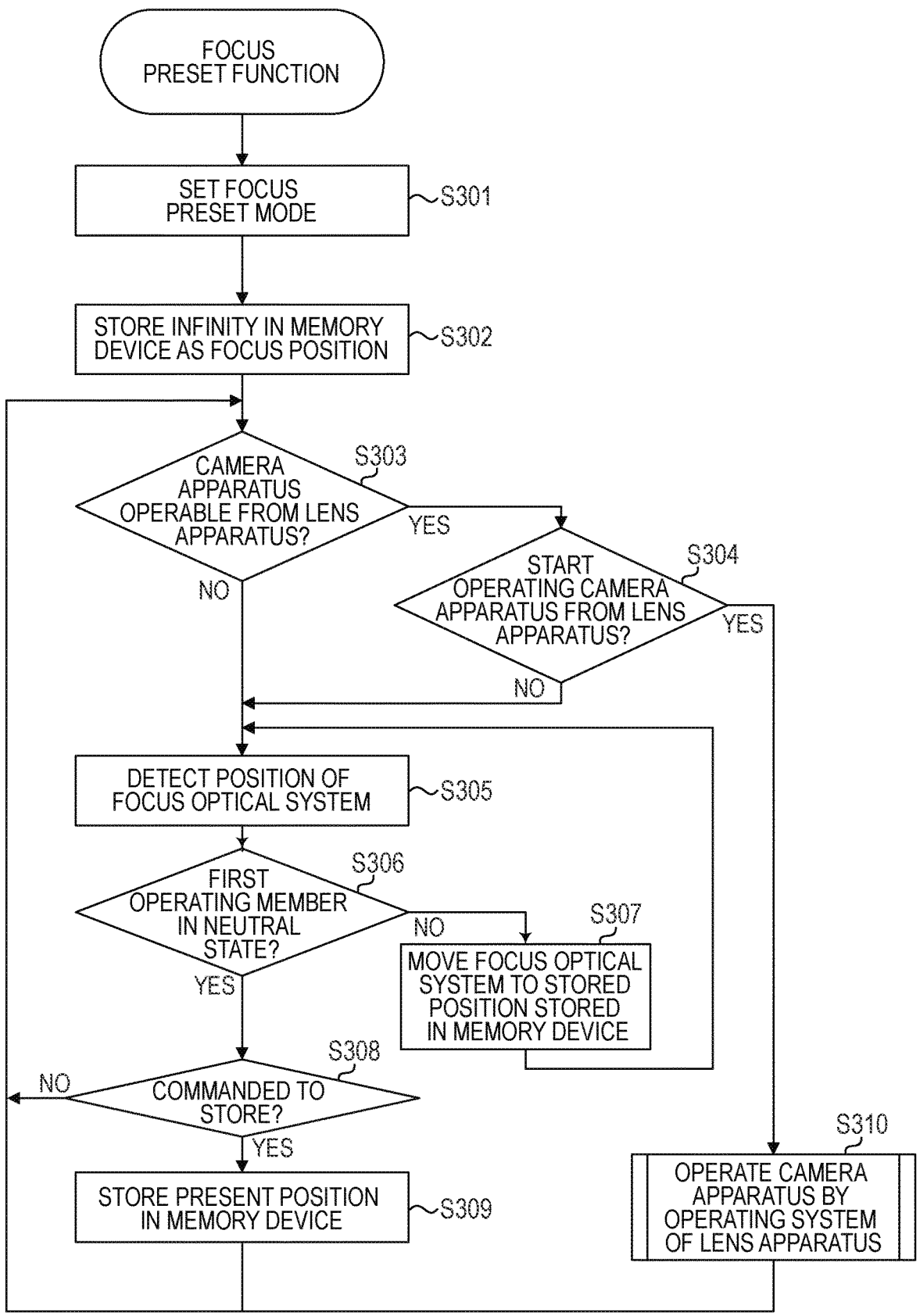
FIG. 4 is a flow chart of operation of the first embodiment.
Figure 5:
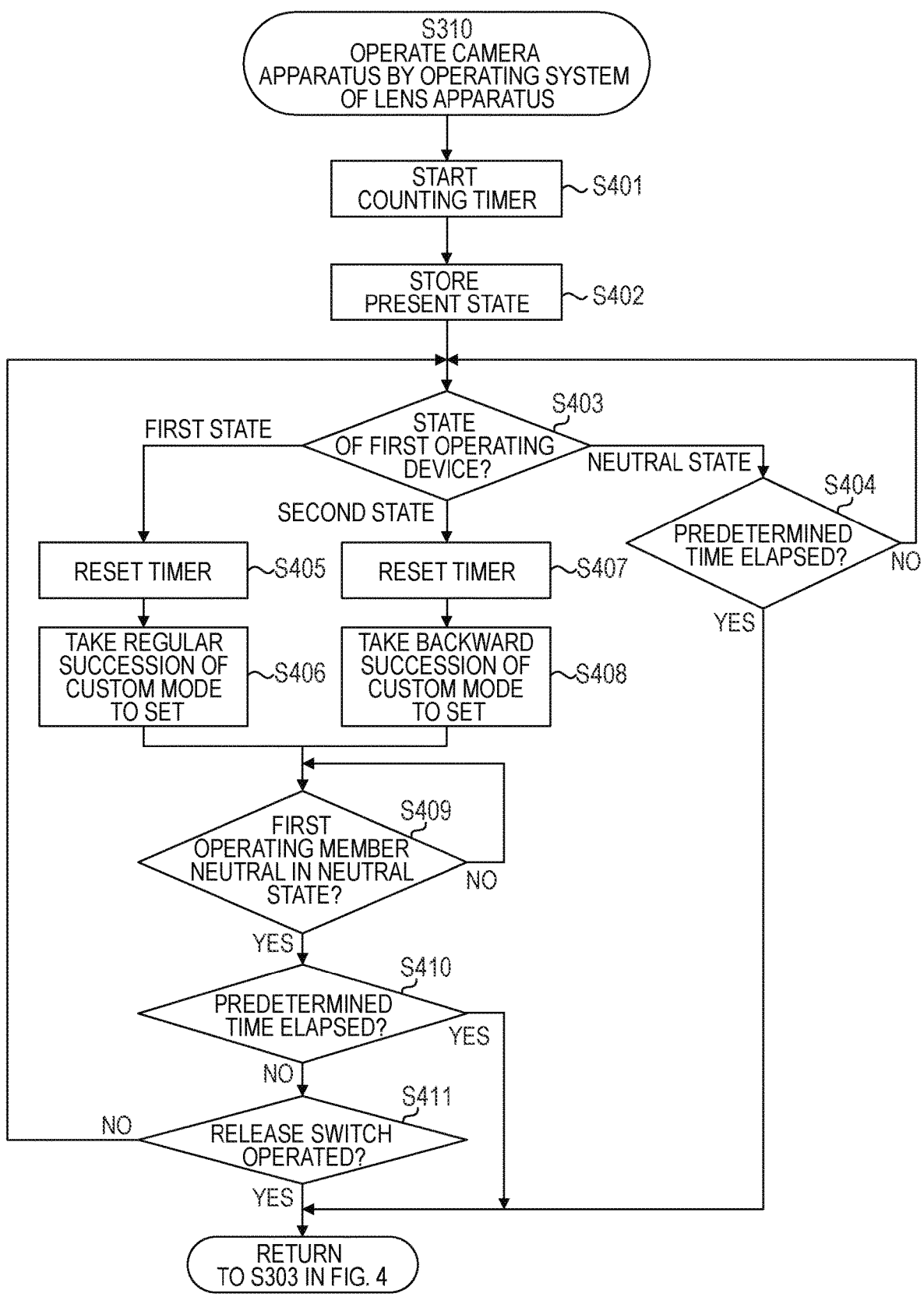
FIG. 5 is a flow chart of operation of the first embodiment.

The camera operation start instruction device 117 can be assigned with a function to be operated. When the function outputting the signal for starting the operation of the camera from the lens apparatus, which is the function of the aspect of the embodiments described later with reference to FIGS. 4 and 5, is not validated, another function is assigned to the camera operation start instruction unit 117. For example, in an image pickup apparatus having a function that performs an object identification to track an object in a set frame to keep an in-focus state for the object, the camera operation start instruction device 117 is used for a function to stop tracking object for focus adjustment forcibly and to fix an in-focus distance in order to prevent the in-focus distance from changing to another object crossing in front of the tracking object. For example, the function may lock the in-focus distance during the button being pressed, or may switch between locking the in-focus distance and tracking an object for the in-focus distance each time the button is pressed.

The tripod mount ring 116 is a ring that supports the lens apparatus 100 rotatable about the optical axis of the lens apparatus 100 so as to allow image pickup in vertical position while keeping the lens apparatus 100 fixed to the tripod mount when using the tripod for image pickup.

FIG. 4 is a flowchart for describing a control method (first mode) relating to a focus preset function which is a function using the first operating member 110. FIG. 5 is a flowchart for describing a function for calling one of a plurality of custom settings registered as the combination of the various parameters for image pickup, where the function is the characteristic part of the aspect of the embodiments in which the operation of the camera operation instruction start parameter unit 117 and the operation of the first operating member 110 are combined. The control method shown in FIGS. 4 and 5 is embodied as a program executable by a computer and executed by a lens microcomputer 112.

An explanation will be given from the initial state when the camera 200 and the lens apparatus 100 are electrically connected and the power switch 201 of the camera 200 is turned on.

When the power is turned on by the power switch of the camera 200, the process of the control related to the focus preset function shown in FIG. 4 is started.

First, in step S301, the lens microcomputer 112 sets the focus preset mode.

Next, in step S302, a focus position focusing on an infinity is stored in the memory device 111 as a default setting.

Subsequently, in step S303, the state of the camera operation permission device 115 is checked. The process proceeds to step S304 if "camera being operable by operation of lens apparatus" is set. The process proceeds to step S305 if "camera being not operable by operation of lens apparatus" is set.

In step S305, the focus position detector 105 detects the current focus position, and the process proceeds to step S306.

In step S306, the first detector 114 detects the operation state of the first operating member 110. If the state of the first operating member 110 is either the first state or the second state, the process proceeds to step S307 to move the focus optical system to the focus position stored in the memory device 111. The drive speed at this time is the maximum speed that can be driven by the focus driving device 102. If the state of the first operating member 110 is a neutral state, the process proceeds to step S308.

In step S308, the lens microcomputer 112 obtains the state of the storing instruction switch 108 detected by the third detector 109. When the operation of the storing instruction switch 108 is detected, the process proceeds to step S309.

In step S309, a buzzer sound/an LED provided in the camera 200 or in the lens apparatus 100 is sounded/blinked to make the operator recognize that the current position is to be stored, and the current position of the focus optical system detected in step S305 is stored in the memory device 111 (the position stored in step S302 is overwritten by the position detected in step S305 to update).

In step S303, when the state of the camera operation permission device 115 is set to "camera being operable by operation of lens apparatus device", the process proceeds to step S304 where the state of the camera operation starting instruction unit 117 is detected.

In step S304, the process proceeds to step S310 if detected that the camera operation start instruction unit 117 is depressed (trigger signal is output) to start the operation of the camera is commanded, and the process proceeds to step S305 if the start of the operation of the camera is not started.

Next, the characterized portion of the aspect of the embodiments will be described.

Figure 3:
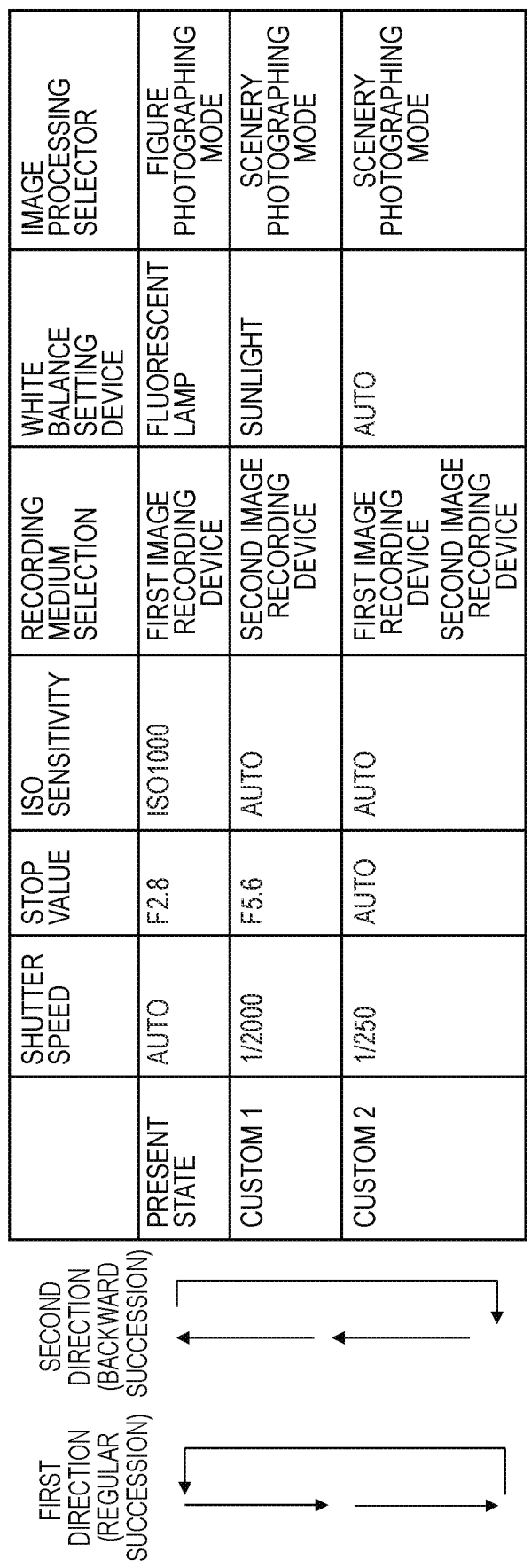
FIG. 3 is a list of various parameters assigned to each of the custom settings of the first embodiment.

The camera microcomputer 210 is capable of storing combinations of various parameters, image processing contents relating to image pickup and a selection of objects (first image recording device 208/second image recording device 209) in which the image is stored. For example, as shown in FIG. 3, a plurality of the image capturing conditions related to the image pickup preferred by the user such as "present state", "custom 1", "custom 2" and the like which are independently set in advance of the image pickup, is stored. And one of the combinations of these pickup parameters and the like is instantly selected and called by an easy operation without interrupting image pickup during image pickup, and can be reflected in the image pickup. If there is a pickup parameter which is expected to be changed in accordance with image pickup condition during image pickup, one or more sets of pickup parameters are stored in advance, and if necessary, in image pickup, a set of pickup parameters stored in advance can be called and the image pickup can be performed by a simple operation with the stored parameters being reflected. Further, in addition to the preset image pickup store parameter combinations such as "custom 1" and "custom 2", the "combination of pickup parameters and the like" at the time of selecting and calling one of the combinations of pickup parameters and the like is also stored as "the present state" (one of the options), whereby returning to the setting of "the present state" from the combination of pickup parameters such as "custom 1" and "custom 2" is enabled.

The setting item includes at least one of shutter speed, stop value, ISO sensitivity, store medium selection, white balance setting, and selection of image processing contents to be stored. Thus, a combination of conditions from picking up image to storing the picked up image in the memory medium can be stored as a custom setting (custom 1, custom 2, and the like). The combination of the pickup parameters is displayed on the image display device 213 in real time every time the custom setting changes to "present state", "custom 1", "custom 2", and the like.

Referring to FIG. 5, a flow of a control (second mode) for operating the switching of the combination of the pickup parameters stored in the camera microcomputer 210 of the camera from the lens apparatus, which is started in the step S310, will be described. As described with reference to FIG. 4, when both conditions of the camera operation permission device 115 and the camera operation start instruction unit 117 (switching devices) are met, the control in the above-described second mode is started.

In step S401, the timer starts counting time from the depression of the button of the camera operation start instruction unit 117 in step S304, and the process proceeds to step S402.

In step S402, the "the present state" that is the combination of the pickup parameter immediately after the instruction of the start of the image pickup operation is stored to enable the return later.

In step 403, the first detector 114 confirms the state of the first operating member 110. If the first operating member 110 is in the neutral state, the process proceeds to step S404. If the first operating member 110 is in the first state, the process proceeds to step S405. If the first operating member 110 is in the second state, the process proceeds to step S407.

In step S404, the count value of the timer is checked to determine whether or not the predetermined time has passed. Although the predetermined time is set to 1.5 seconds in this embodiment, the disclosure is not limited thereto. If the first operating member 110 remains the neutral state in step S403 even after a predetermined time passed, it can be understood that the operator has no intention to operate the camera from the lens apparatus and that the camera operation start instruction unit 117 was erroneously operated to cause the process to proceed from step S305 to step S310, to whereby terminate process in FIG. 5 to return to step S303 in FIG. 4. If the predetermined time has not passed in step S404, the process returns to step S403.

In step S405, the timer count is reset, and the process proceeds to step S406.

In step S407, the timer count is reset, and the process proceeds to step S408.

In step S406, the parameter set is sequentially changed in a forward feeding (regular succession). That is, in the example shown in FIG. 3, a switching signal for commanding the transition from "present state" that is the state before the custom setting is selected to the Custom 1 (forward feeding) is output from the communication device 150 of the lens apparatus 100 to the communication device 250 of the camera 200. After the set of parameters and the like is changed, the process proceeds to step S409.

In step S408, a set of parameters or the like (custom setting) is sequentially changed in a reverse feeding (backward succession). That is, in the example shown in FIG. 3, a switching signal for commanding the transition (in reverse feeding) from the "present state" that is the state before the custom setting is selected to the custom 2 is output from the communication device 150 of the lens apparatus 100 to the communication device 250 of the camera 200. After the set of parameters and the like is changed, the process proceeds to step S409.

In step S409, the process waits for the first operation unit 110 to return from a state as a result of an operation to the neutral state, and then proceeds to step S410.

In step S410, it is determined whether or not the timer count value has passed a predetermined time. If passed the predetermined time, it is determined that the selection of the custom setting has been completed, and the process returns to step S303 in FIG. 4. If not passed the predetermined time, the process proceeds to step S411.

In step S411, when the release switch 202 of the camera 200 is subjected to the half-depression operation or the full-depression operation, it is determined that the selection of the custom setting has been completed, and the process returns to step S303 in FIG. 4. If the release switch 202 is not operated, it is determined that the selection of the custom setting is not completed, and the process returns to step S403. When the release switch 202 is fully depressed, the selection of the custom setting is finished and the set of parameters to be applied to the image pickup is fixed, and the image pickup is performed under the set of the parameters. That is, when any release operation of the camera is performed, the selection of the custom setting is completed, and the combination of the parameters to be applied to the image pickup is set.

After that, when the first operating member 110 is operated in step S403, the custom setting can be selected by switching in forward feeding or reverse feeding based on the first operating member 110 being in the first state or in the second state.

Thereafter, as described above, the process returns to step S303 of FIG. 4 when it is determined that the selection of the custom setting has been completed.

After calling the custom setting, each parameter in the custom setting can be adjusted or changed by using the operation dial 214 on the back of the camera or the menu setting on the side of the camera. This allows the user to call a custom mode that is a reference when switching the image pickup state from one to another, and then adjust the items the user wants to perform a fine adjustment from it. In this way, it is possible to enter the next image-pickup preparation stage immediately because only the minimum adjustment is required. Also, the parameter combination set here can be registered in a new custom setting, and it can be called again by overwriting the original custom setting.

In this embodiment, the number of stored patterns is 3 (present state, custom 1, custom 2) including the "present state" that is the state before the custom selection. However, the number of patterns to be stored is not limited to 3, and the aspect of the embodiments is equally applicable to 2 patterns and 4 patterns or more.

In step S410, it is determined whether or not the selection of the custom setting is completed based on the presence or absence of the operation of the release switch 202, but the disclosure is not limited thereto. The determination may be based on an input of another switch, button, or the like, but in view of the compactness of the apparatus and the operability of image pickup, in one embodiment, the determination is based on the input of the release switch as illustrated.

In the present embodiment, the first operating member 110 is configured to output the neutral state, the first state, and the second state, but the disclosure is not limited thereto. The same effect can be obtained even if the first operating member is configured to output two state signals, where one corresponding to the neutral state signal and the other corresponding to either the first state signal or the second state signal, and is configured to change the state signals through one of the forward and reverse feedings.

Embodiment 2

Next, a second embodiment will be described in which the object to be registered in each custom setting is expanded to include the function on the lens apparatus.

Figure 6:
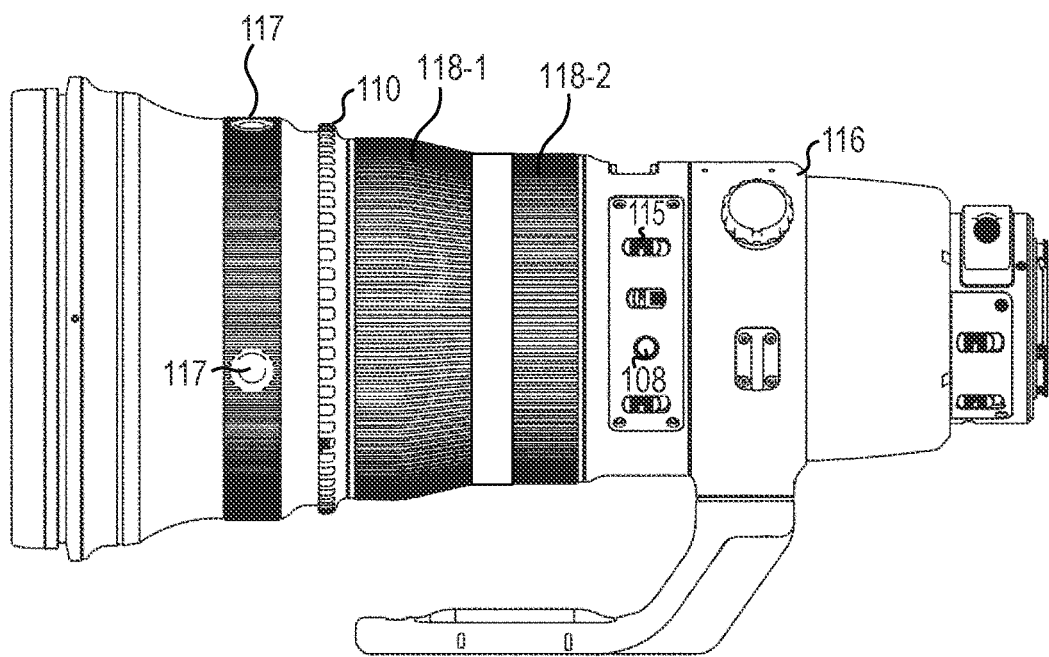
FIG. 6 is a system diagram including a lens apparatus and a camera of second embodiment.

In FIG. 6, only parts different from the configuration of the first embodiment will be described. In the first embodiment, the second operating member 118 is one ring, but in this embodiment, two operating member 118-1 and 118-2 are provided. The operating member 118-1 and the operating member 118-2 are respectively provided with a detector 119-1 and a detector 119-2. The operation amount and the operation direction of the operating member 118-1 and the operating member 118-2 can be detected. Each of the operating member 118-1 and the operating member 118-2 has a structure for making a user feel a click feeling every predetermined interval of rotation about the optical axis in order to transmit the operation feeling to the user.

Figure 7:
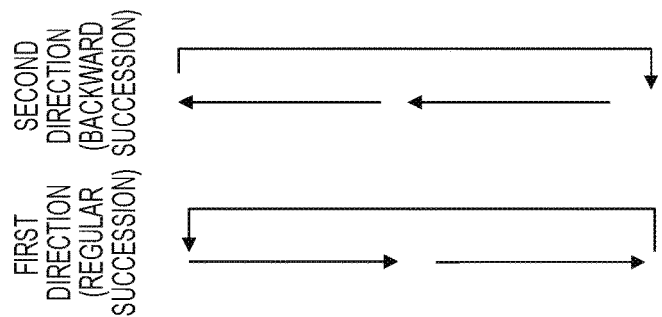
FIG. 7 is a list of various parameters assigned to each custom setting of the second embodiment.

In FIG. 7, as same as the case of the first embodiment, combinations of various parameters, image processing contents concerning the image pickup and selection of the image recording object are assigned to the custom setting. In addition, in the second embodiment, the item of the parameter includes an assignment to the operation ring on the lens apparatus. Specifically, the setting of the object to be adjusted when the operating member 118-1 is operated and the setting of the object to be adjusted when the operating member 118-2 is operated are added.

Assume that under certain conditions in image pickup, the various setting states are set in the "present state". Then, assume that "custom 1" is selected by the operation described in the first embodiment. By the selection, the operating member 118-1 becomes a ring to change the shutter speed, and the operating member 118-2 becomes a ring to change the stop value. The target parameter increases or decreases by one unit for each click felt by the operator during operation.

As described above, by the combination of the camera operation start instruction unit 117 and the first operating member 110 both provided in the lens apparatus 100, the pickup parameter can be easily changed when the image pickup environment and/or the object are changed significantly. The camera operation permission device 115 is not necessarily installed in the lens apparatus 100, but may be installed on the camera 200 or may be included in a setting menu in a menu in the camera 200. The first operating member 110 is configured as a rotation capable ring member about the optical axis of the lens apparatus 100. Therefore, the same operability can be maintained in image pickup both in the horizontal composition and in the vertical composition. With this configuration, even during image pickup, it is possible to cope with a case of necessity of an immediate operation of the first operating member 110 without significantly changing the image pickup posture.

In addition, if there is no operation of the first operating member 110 for a predetermined time since started counting time when the operation of the camera operation start instruction unit 117 is operated, and the flow returns to the flow of FIG. 4 without performing the change process of the pickup parameters. Therefore, the erroneous selection of the function of the camera 200 and the unexpected change of the pickup parameters caused by an erroneous operation can be prevented.

The camera operation start instruction unit 117 is arranged at multiple locations around the optical axis of lens apparatus 100. In one embodiment, the camera operation start instruction unit 117 is arranged at 4 positions, apart from each other by 90 degrees around optical axis. Such arrangement can provide the same operability even in image pickup in the horizontal position (long in horizontal direction) and in image pickup in the vertical position (long in vertical direction). A counterclockwise rotation operation of the first operating member 110 when viewed from an operator of the main body of the camera is defined as the first state, and a clockwise rotation operation of the first operating member 110 when viewed from the operator is defined as the second state.

However, the aspect of the embodiments is not limited to these types of operations, and the first operating member 110 may be a member having an operation member movable in the optical axis direction. In such configuration, the first state can be defined as a state when the first operating member 110 moves to the object side with respect to a reference position which is a predetermined position to which the first operating member 110 automatically returns. The second state can be defined as a state when the first operating member 110 moves to the side of the camera 200 with respect to the reference position.

Further, the first operating member 110 may be a member that is operable both in the rotation operation about the optical axis and in the moving operation in the optical axis direction. In that case, the range of choices for state increases.

The first operating member 110 may be a switch of a lever type that returns to a middle point. In this case, the state of the first operating member 110 is determined according to the moving direction and the amount of the movement.

The operation members provided in the lens apparatus 100 are arranged from the object side to the side of the camera 200, the operation start instruction unit, the first operating unit, and the second operating unit. Thus, the operation start instruction unit is disposed on a fixed member on the front side of the lens apparatus 100, so that the operation start instruction unit can be operated in a state where the heavy equipment is firmly held in the front side of the lens apparatus.

Further, by the arrangement of the first operating member adjacent to the operation start instruction unit, the custom setting can be easily called without greatly changing the holding posture (image pickup posture) of the lens apparatus 100.

Although the second operating member 118 (operating member 118-1, operating member 118-2) is described as a circular ring that provides click feelings when the ring is rotated by the operation, the second operating member 118 does not necessarily provide the click feelings to the operator and is not necessary the circular ring around the optical axis of the image pickup optical system 101. If the second operating member 118 does not provide the click feelings to the operator, the set of parameters may be incremented or decremented by every detection of rotation of a predetermined unit of angle. If the second operating member 118 is not a circular ring, a small dial provided on the lens apparatus may be adopted.

In this embodiment, a combination of a shutter speed, a stop value, an ISO sensitivity, a recording medium selection, a white balance, image processing content, and object to be operated by operating member can be selected as a parameter component to be assigned to each custom setting and to be stored.

It is also conceivable that the dedicated dial for selecting a mode in which the shutter priority mode, the aperture priority mode, the ISO priority mode, and the like can be set is not mounted on the camera 200, or that the display is the electronic display is provided for displaying the selection even if the dedicated dial is provided. In those cases, selection of the shutter priority mode, the aperture priority mode, or the ISO priority mode may also be included as a part of the various parameter groups assigned to each custom setting. However, the aspect of the embodiments is not limited to this configuration. It is possible to assign a selection of the function of the lens apparatus 100 and various parameters, and a selection of the function of the camera 200 and various parameters to a custom setting.

In the embodiments, the first operating member is exemplified as being configured as a ring member provided on the exterior of the lens apparatus and rotatable about the optical axis of the image pickup optical system, but the disclosure is not limited to this configuration. For example, a first operating member may be a member provided on the exterior of the lens apparatus and may be configured to be rotatable about the optical axis of the image pickup optical system, but may not be a member having a ring shape and may be a member including a portion of arc shape having a portion of a circular ring shape. Also, the member having the ring shape or the member having a portions of the circular ring shape as the first operating member, all of the member is not necessarily exposed to the exterior of the lens apparatus, and a portion to be operated by the operator is to be exposed to the exterior of the lens apparatus so as to be operated by the operator from the outside of the lens apparatus.

Other Embodiment

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The embodiments described above are merely representative examples, and various deformation and modifications can be made to the embodiments in the practice of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-125705, filed Jul. 22, 2020, which is hereby incorporated by reference herein in its entirety.

What is claimed is:

1. A lens apparatus connected to a camera configured to pick up an image based on a set pickup parameter, comprising:
   a first operating member;
   a controller configured, based on an operation of the first operating member, to control a function of the lens apparatus in a first mode and to output a signal for switching a setting of a combination of pickup parameters including a function of the camera in a second mode; and
   a switching device configured to switch from the first mode to the second mode,
   wherein the combination of pickup parameters in the second mode is previously set by a user.

2. The lens apparatus according to claim 1, wherein in the second mode, based on an operation of the first operating member, the controller further configured to:
   change the combination of the pickup parameters of the camera to be selected in a regular succession;
   change the combination of the pickup parameters of the camera to be selected in a backward succession; and
   set the selected combination.

3. The lens apparatus according to claim 2, wherein the controller is configured to switch from the second mode to the first mode based on a time from being switched to the second mode by the switching device and a state of the first operating member.

4. The lens apparatus according to claim 1, wherein the controller switches from the second mode to the first mode based on a signal from the camera or a signal indicating that a release operation was performed from the camera.

5. The lens apparatus according to claim 1, wherein the controller switches from the second mode to the first mode based on a signal indicating that a release operation is performed from the camera.

6. The lens apparatus according to claim 2,
   wherein the first operating member is a ring member configured to rotate in a predetermined rotation range about an optical axis;
   wherein the first operating member is configured to output a signal corresponding to a neutral state in which the first operating member is positioned at a position to which the first operating member automatically returns, a signal corresponding to a first state which is a state in which the first operating member is rotated to one side with respect to the neutral state, and a signal corresponding to a second state in which the first operating member is rotated to the other side with respect to the neutral state.

7. The lens apparatus according to claim 1,
wherein the switching device comprises a trigger device and a lock device;
wherein the lock device is a switch that switches between using an input from the trigger device as a trigger for switching to the second mode and using the input from the trigger device as an input for operation of another function of the lens apparatus.

8. The lens apparatus according to claim 7, wherein the trigger device and the first operating member are provided on an outer periphery of the lens apparatus and are arranged adjacently to each other in a direction of the optical axis.

9. The lens apparatus according to claim 7, wherein the trigger device has an arrangement disposed in a plurality of locations with an interval of 90 degrees about the optical axis.

10. The lens apparatus according to claim 1, comprising a memory device configured to record the plurality of combinations of the pickup parameters to be selected in the second mode.

11. The lens apparatus according to claim 10, wherein the memory device is configured to record the combination of the pickup parameters at a time of transition to the second mode as an option for switching the combination of the pickup parameters in the second mode.

12. The lens apparatus according to claim 1, wherein the plurality of pickup parameters in the second mode comprises a function of the lens apparatus and a function of the camera.

13. The lens apparatus according to claim 1, comprising a second operating member that is a ring member configured to be rotatable about the optical axis and to which an object to be operated by the lens apparatus can be assigned,
wherein the plurality of pickup parameters in the second mode includes an assignment of an object to be operated by the second operating member.

14. A pickup apparatus, comprising:
a lens apparatus connected to a camera configured to pick up an image based on a set pickup parameter, comprising:
  a first operating member;
  a controller configured, based on an operation of the first operating member, to control a function of the lens apparatus in a first mode and to output a signal for switching a setting of a combination of pickup parameters including a function of the camera in a second mode; and
  a switching device configured to switch from the first mode to the second mode; and
a camera including a pickup element configured to receive a light of an image formed by the lens apparatus, the camera configured to pick up an image by switching pickup parameters based on a switching signal of combination of the pickup parameters from the lens apparatus.

15. The pickup apparatus according to claim 14, wherein the combination of pickup parameters includes at least one of a shutter speed, a stop value, an ISO sensitivity, a selection of recording medium, a white balance setting, a content, and an object to be operated by an operating member.

16. The pickup apparatus according to claim 14, wherein in the second mode based on an operation of the first operating member, the controller further configured to:
change the combination of the pickup parameters of the camera to be selected in a regular succession;
change the combination of the pickup parameters of the camera to be selected in a backward succession; and
set the selected combination.

17. The pickup apparatus according to claim 14, wherein the controller switches from the second mode to the first mode based on a signal from the camera or a signal indicating that a release operation was performed from the camera.

18. The pickup apparatus according to claim 14,
wherein the switching device comprises a trigger device and a lock device;
wherein the lock device is a switch that switches between using an input from the trigger device as a trigger for switching to the second mode and using the input from the trigger device as an input for operation of another function of the lens apparatus.

19. The pickup apparatus according to claim 14, comprising a memory device configured to record the plurality of combinations of the pickup parameters to be selected in the second mode.

20. The pickup apparatus according to claim 14, wherein the plurality of pickup parameters in the second mode comprises a function of the lens apparatus and a function of the camera.

* * * * *